(12) United States Patent
Erb et al.

(10) Patent No.: US 11,136,070 B2
(45) Date of Patent: Oct. 5, 2021

(54) FIBER COMPOSITE PART OF A MOTOR VEHICLE, MOUNTING PART FOR SUCH A FIBER COMPOSITE PART AND MANUFACTURING METHOD

(71) Applicant: Dr. Ing. h.c.F. Porsche Aktiengesellschaft, Stuttgart (DE)

(72) Inventors: Thiemo Erb, Stuttgart (DE); Markus Brunner, Sachsenheim (DE); Thomas Meier, Rheinstetten (DE); Eduard Ene, Gifhorn (DE)

(73) Assignee: Dr. Ing. h.c.F. Porsche Aktiengesellschaft

( * ) Notice: Subject to any disclaimer, the term of this patent is extended or adjusted under 35 U.S.C. 154(b) by 214 days.

(21) Appl. No.: 16/598,737

(22) Filed: Oct. 10, 2019

(65) Prior Publication Data
US 2020/0102023 A1   Apr. 2, 2020

Related U.S. Application Data

(62) Division of application No. 13/846,987, filed on Mar. 19, 2013, now abandoned.

(30) Foreign Application Priority Data

Mar. 19, 2012   (DE) .................... 10 2012 102 290.9

(51) Int. Cl.
*B62D 29/04* (2006.01)

(52) U.S. Cl.
CPC ......... *B62D 29/048* (2013.01); *Y10T 29/4998* (2015.01); *Y10T 29/49622* (2015.01); *Y10T 29/49947* (2015.01); *Y10T 29/49982* (2015.01); *Y10T 428/24479* (2015.01)

(58) Field of Classification Search
CPC ............ B62D 29/048; Y10T 29/49622; Y10T 29/4998; Y10T 29/49982; Y10T 29/49947; Y10T 428/24479; B29C 45/005; B29C 2045/001; B29C 45/16; B29C 2045/1692
USPC ..... 29/527.1, 527.2, 525.01, 897.2; 264/255, 264/328.18
See application file for complete search history.

(56) References Cited

U.S. PATENT DOCUMENTS

| 3,489,312 A | 1/1970 | Hunckler |
| 3,594,265 A | 7/1971 | Wicker et al. |
| 4,044,188 A | 8/1977 | Segal |

(Continued)

FOREIGN PATENT DOCUMENTS

| JP | H10253427 | 9/1998 |
| JP | 2011143609 | 7/2011 |

(Continued)

OTHER PUBLICATIONS

Korean Office Action dated 2014.

(Continued)

*Primary Examiner* — Sarang Afzali
*Assistant Examiner* — Darrell C Ford
(74) *Attorney, Agent, or Firm* — Gerald E. Hespos; Michael J. Porco; Matthew T. Hespos

(57) ABSTRACT

A mounting part (11) for affixing a composite fiber part of a motor vehicle to at least one adjoining component of a motor vehicle is made from a fiber composite material. The mounting part (11) has a three-dimensionally shape that defines ribs and/or webs and/or protrusions and/or depressions.

8 Claims, 1 Drawing Sheet

(56) References Cited

U.S. PATENT DOCUMENTS

| | | | |
|---|---|---|---|
| 5,041,258 A * | 8/1991 | Iiyama | B29C 45/0005 |
| | | | 264/328.1 |
| 5,264,261 A * | 11/1993 | Bush | B29C 48/08 |
| | | | 428/36.4 |
| 6,855,283 B2 * | 2/2005 | Hilligoss | B29C 70/086 |
| | | | 264/255 |
| 7,059,815 B2 | 6/2006 | Ando | |
| 7,976,928 B2 | 7/2011 | Miyachi | |
| 2008/0287021 A1 | 11/2008 | Kajiok et al. | |
| 2009/0126180 A1 * | 5/2009 | Keener | B29C 66/21 |
| | | | 29/505 |
| 2009/0211580 A1 | 8/2009 | Garofalo | |
| 2009/0269255 A1 * | 10/2009 | Yoshimi | B32B 5/02 |
| | | | 422/179 |
| 2010/0001137 A1 | 1/2010 | Keener | |
| 2011/0001137 A1 | 1/2011 | Yoon et al. | |
| 2011/0150602 A1 | 6/2011 | Sieper et al. | |
| 2012/0248821 A1 | 10/2012 | Schmied et al. | |
| 2013/0313860 A1 * | 11/2013 | Yamaji | B62D 25/20 |
| | | | 296/193.07 |
| 2013/0313862 A1 * | 11/2013 | Yamaji | B62D 25/2036 |
| | | | 296/203.01 |
| 2015/0151506 A1 * | 6/2015 | Hawley | B32B 5/028 |
| | | | 428/141 |

FOREIGN PATENT DOCUMENTS

| | | |
|---|---|---|
| KR | 2008010758 | 11/2008 |
| WO | 2011051227 | 5/2011 |

OTHER PUBLICATIONS

Japanese Office Action dated Mar. 25, 2015.
Korean Office Action dated 2015.
StarThermoplastics. Thermoplastic v. Thermoset. Obtained from StarThermoplastrics.com on Apr. 3, 2019.

* cited by examiner

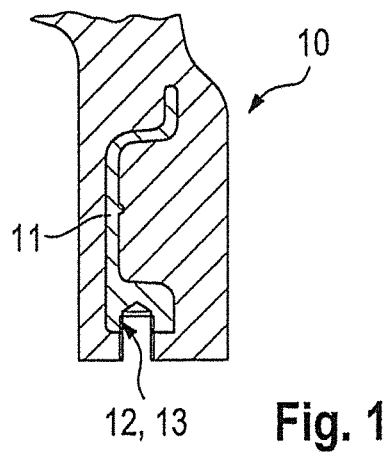
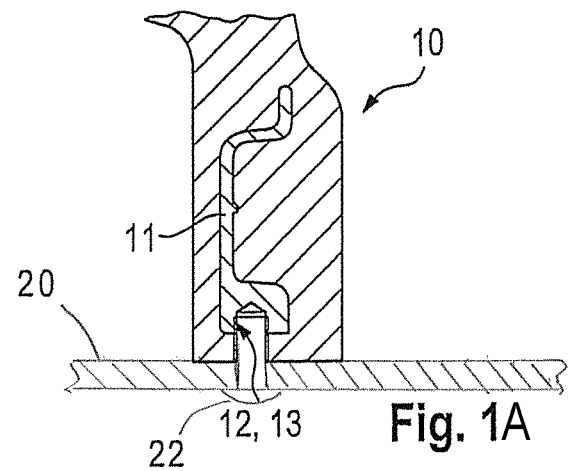
Fig. 1    Fig. 1A
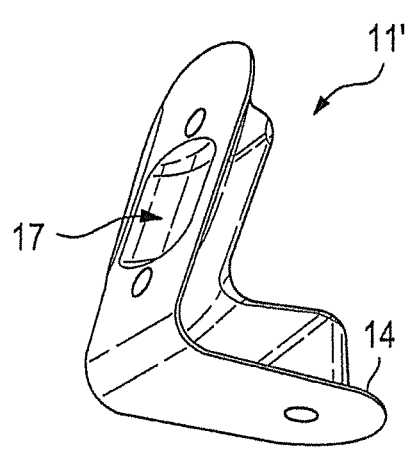
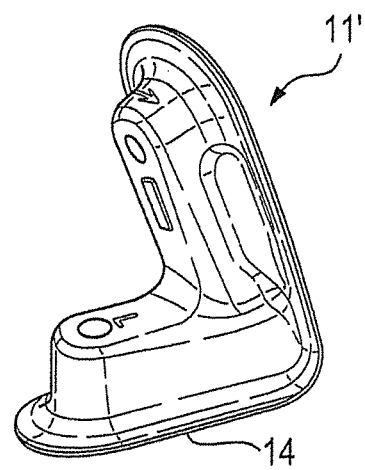
Fig. 2
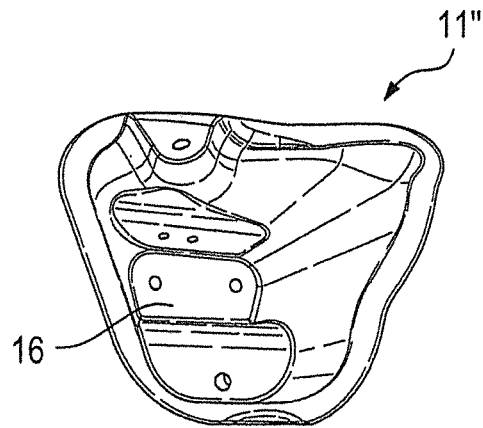
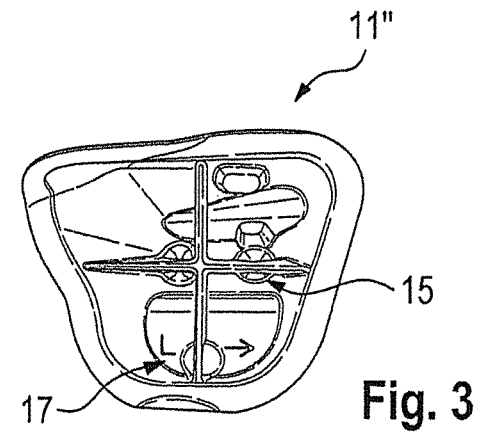
Fig. 3

FIBER COMPOSITE PART OF A MOTOR VEHICLE, MOUNTING PART FOR SUCH A FIBER COMPOSITE PART AND MANUFACTURING METHOD

CROSS REFERENCE TO RELATED APPLICATIONS

The present application is a divisional application of U.S. patent application Ser. No. 13/846,987, filed Mar. 19, 2013, the contents of which are hereby incorporated by reference in their entirety. Application Ser. No. 13/846,987 claims priority under 35 USC 119 to German Patent Appl. No. 10 2012 102 290.9 filed on Mar. 19, 2012, the entire disclosure of which is incorporated herein by reference.

BACKGROUND

1. Field of the Invention

The invention relates to a mounting part for affixing a fiber composite part of a motor vehicle to at least one adjoining component of the motor vehicle. Furthermore, the invention relates to a fiber composite part, to a method for manufacturing the mounting part and to a method for manufacturing the fiber composite part.

2. Description of the Related Art

Fiber composite parts made from carbon fiber reinforced or glass fiber reinforced polymers are increasingly used in motor vehicles to achieve weight reductions. However, it is necessary to connect the fiber composite parts to at least one adjoining component of the motor vehicle. Mounting parts, or inserts, incorporated in the respective fiber composite part to connect the fiber composite parts to the adjoining component. According to the prior art, these mounting parts incorporated in a fiber composite part are metallic, and usually aluminum.

The metallic mounting part used for affixing the fiber composite part to an adjoining component of the motor vehicle must be coated with an adhesion promoter and an anti-corrosion agent prior to being introduced into the fiber composite part. As a result, manufacturing expenses are increased.

Fiber composite parts used with metallic mounting parts are disclosed in WO 2011/051227 A1.

An object of the present invention is to provide an innovative mounting part for affixing a fiber composite part of a motor vehicle to at least one adjoining component of the motor vehicle, an innovative fiber composite part and a method for manufacturing the mounting part and the fiber composite part.

SUMMARY OF THE INVENTION

The invention relates to mounting parts that are incorporated or embedded in a fiber composite part for affixing the fiber composite part to an adjoining component. The mounting parts of the invention are made from a fiber composite material. As a result, and unlike the prior art, there is no need to coat the mounting parts with an adhesion promoter and an anti-corrosion agent prior to being incorporated, thereby reducing manufacturing expenses. Moreover, the fiber composite mounting parts ensure an integral bond between the mounting parts and the fiber composite part.

The mounting part is made from a carbon fiber reinforced or a glass fiber reinforced polymer with relatively short fibers between 3 mm and 100 mm in length, and preferably between 20 mm and 80 mm in length. This defined length of the relatively short fibers for the mounting part allows on the one hand the guarantee of a sufficient strength of the mounting part, and on the other hand the provision of a three-dimensional shape analogous to that of metallic mounting parts.

The mounting part preferably comprises between 30% by volume and 70% by volume, in particular between 40% by volume and 65% by volume, fibers and furthermore between 70% by volume and 30% by volume, in particular between 60% by volume and 35% by volume, a thermosetting polymer. This composition of the mounting part of fibers and thermosetting polymer is advantageous for guaranteeing a high strength of the mounting parts.

The mounting part preferably is manufactured by preparing a liquid or flowable mixture of polymer and fibers. The mixture then is filled into a three-dimensionally shaped mold for the mounting part. The mold then is closed and the mounting part is cured for a defined period of time at a defined temperature and a defined pressure. The aforementioned method enables the manufacturing of three-dimensionally shaped mounting parts with sufficient strength from a fiber composite material with simple means. In this context the term "flowable" does not mean that the mixture has to be "flowable" already at room temperature. Rather, the mixture may take the form of a sheet at room temperature and an appropriately weighed amount may be filled into the mold. The mixture conforms to the three-dimensionally shaped mounting part once the mold has been closed on the basis of temperature and pressure.

The mounting part preferably is cured in the mold for a period of between 0.5 min and 10 min at a temperature between 100° C. and 200° C. and at a pressure of more than 100 bar. The abovementioned process parameters are advantageous, with the tool preferably being heated isothermally during the curing of the mounting part.

Exemplary embodiments of the invention are explained with reference to the drawing, without being limited to this.

BRIEF DESCRIPTION OF THE DRAWINGS

FIG. 1 is a detail of a fiber composite part of a motor vehicle according to the invention in cross section in the region of an incorporated mounting part and FIG. 1a is a detail of the fiber composite part mounted to an adjoining component of a motor vehicle.

FIG. 2 is a first mounting part in different perspective views.

FIG. 3 is a second mounting part in different perspective views.

DETAILED DESCRIPTION OF THE PREFERRED EMBODIMENTS

The invention relates to a mounting part for affixing a fiber composite part of a motor vehicle to at least one adjoining component of the motor vehicle. The mounting part is incorporated or embedded in the respective fiber composite part and is referred to as an insert. The invention also relates to a fiber composite part of a motor vehicle with at least one such mounting part and to a method for manufacturing the mounting part and the fiber composite part.

FIG. 1 is a partial schematic cross section through a fiber composite part 10 of a motor vehicle in the region of a mounting part 11 incorporated or embedded in the fiber composite part 10. The mounting part 11 is provided for affixing the fiber composite part 10 to at least one adjoining component 20 of a motor vehicle.

A recess 12 with an internal thread 13 is cut into the mounting part 11 to allow a direct screw connection 22 of the fiber composite part 10 via the mounting part 11 to an adjoining component 20. Alternatively, an internally threaded bush can be inserted into the recess 12 so that the fiber composite part 11 can be screwed indirectly via the threaded bush to an adjoining component 20.

The mounting part 11 incorporated in the fiber composite part 10 is a three-dimensionally shaped structure with ribs, and/or webs and/or protrusions and/or depressions. FIGS. 2 and 3 show in different perspective views examples of three-dimensionally shaped mounting parts 11 and 11" formed with ribs 14, webs 15, protrusions 16 and/or depressions 17.

The mounting parts 11, 11 or 11" for a fiber composite part are made from a fiber composite material, namely from a carbon fiber reinforced or a glass fiber reinforced polymer with relatively short fibers. The carbon fiber reinforced or glass fiber reinforced polymer is preferably a thermosetting polymer, in particular an epoxy resin or a vinyl-ester resin or polyurethane.

The relatively short fibers of the mounting part 11, 11' or 11" have a length of between 3 mm and 100 mm. Preferably, the length of the relatively short fibers of the mounting part 11, 11' or 11" is between 20 mm and 80 mm.

The mounting part 11, 11 or 11" may have fibers of exclusively one length, such as short fibers exclusively of a length of 25 mm or 70 mm or 75 mm. Alternatively, the respective mounting part 11, 11' or 11" may have relatively short fibers of at least two different lengths, for example first fibers of a length of 25 mm and second fibers of a length of 50 mm. Likewise it is possible that the mounting part 11, 11' or 11" has first fibers of a length of 10 mm and second fibers of a length of 75 mm.

The use of fibers of different lengths for the mounting part advantageously enables both a sufficient strength of the respective mounting part 11, 11' and 11" and any desired three-dimensional shaping of the part.

The respective mounting part 11, 11' or 11" preferably has between 30% by volume and 70% by volume fibers and between 70% by volume and 30% by volume thermosetting polymer.

The mounting part 11, 11' or 11" preferably comprises between 40% by volume and 65% by volume fibers and between 60% by volume and 35% by volume thermosetting polymer, in particular epoxy resin.

The mounting parts 11, 11' or 11" for a fiber composite part 10 of a motor vehicle themselves uniquely are made from a fiber composite material. In this context relatively short fibers in a defined mixing ratio with a polymer are used in the respective mounting part 11, 11' or 11". Thus, three-dimensionally shaped mounting parts made from a fiber composite material are provided with a three-dimensional shape typically associated with metallic mounting parts and with a sufficiently high strength.

The fiber composite parts 10 and the mounting parts 11, 11' or 11" incorporated therein preferably are made from a fiber composite material, with identical fiber material of different lengths and with an identical polymer material, such as thermosetting polymer, being used in the fiber composite part 10 and in the mounting part 11, 11' or 11".

The fibers of the fiber composite part 10 are relatively long continuous fibers, namely relatively long carbon fibers or glass fibers.

The manufacturing of the mounting part 11, 11' or 11" proceeds by preparing a liquid, in particular a viscous or flowable mixture of polymer and fibers. This mixture preferably comprises between 30% by volume and 70% by volume fibers and the rest polymer, in particular thermosetting polymer. The preferred mixture comprises between 40% by volume and 65% volume fibers and the rest polymer, such as epoxy resin.

This mixture is weighed and the weighed mixture is filled into a three-dimensionally shaped mold for the mounting part. The mold for the mounting part 11, 11' or 11" then is closed and the mounting part is cured in a molding process with a heated mold. The curing in the mold takes place at a defined temperature and at a defined pressure over a defined period of time. In particular, the curing of the mounting part 11, 11' or 11" takes place in an isothermically heated mold at a temperature between 100° C. and 200° C. and at a pressure of more than 100 bar over a period of between 0.5 minutes, that is to say 30 seconds, and 10 minutes.

The manufactured mounting parts 11, 11' or 11" are placed in an uncured fiber composite matrix to form a semi-finished product. This semi-finished product may be a so-called prepreg of fibers and thermosetting polymer or a dry semi-finished product consisting of only fibers, into which, subsequent to the positioning of the mounting parts, thermosetting polymer, in particular epoxy resin, is injected. The fiber composite matrix with the incorporated or embedded and already cured mounting parts 11, 11' or 11" then is cured, and the mounting parts 11, 11' or 11" forming an intimate bond with the identical polymer material of the fiber composite matrix to form a composite part 10.

What is claimed is:

1. A method for manufacturing a composite part of an automobile, the method comprising:
    preparing a liquid or flowable first mixture of a first thermosetting polymer and only fibers having lengths less than or equal to a specified length;
    filling the first mixture into a three-dimensionally shaped first mold configured to form a mounting part having a plurality of external surface regions defining at least one of a rib, a protrusion and a depression and at least one internally threaded recess formed in the mounting part without extending entirely through the mounting part;
    curing the first thermosetting resin of the mounting part;
    preparing a liquid or flowable second mixture of a second thermosetting polymer and only fibers having lengths greater than the specified length to define a fiber composite matrix;
    filling the second mixture into a second mold so that the second mixture covers all of the external surface regions of the mounting part, while leaving an opening at a position aligned with the internally threaded recess of the mounting part;
    curing the second thermosetting polymer to form a composite part that has the mounting part embedded in the fiber composite matrix while the at least one internally threaded recess is accessible via the opening for receiving a screw connection to mount the composite part to an adjoining component of the automobile.

2. The method of claim 1, wherein the step of curing the first thermosetting resin of the mounting part comprises curing the first thermosetting resin in the first mold for a period of between 0.5 min and 10 min at a temperature between 100° C. and 200° C. and at a pressure of more than 100 bar.

3. The method of claim 1, wherein the first mixture comprises between 30% by volume and 70% by volume fibers and between 70% by volume and 30% by volume thermosetting polymer, with the fibers having lengths of between 3 mm and 100 mm.

4. The method of claim 3, wherein the first mixture comprises between 40% by volume and 65% by volume fibers and between 60% by volume and 35% by volume thermosetting polymer, with the fibers having lengths of between 20 mm and 80 mm.

5. The method of claim 1, further comprising placing the cured mounting parts in the fiber composite matrix in an uncured state and then curing the fiber composite matrix around the cured mounting part to form fiber composite part for the automobile.

6. The method of claim 1, wherein the first thermosetting polymer and the second thermosetting polymer are identical.

7. The method of claim 1, wherein the fibers of the fiber composite matrix are carbon fibers or glass fibers.

8. The method of claim 1, further comprising screw-connecting the composite part to a component of the automobile.

* * * * *